United States Patent

Lührsen et al.

[11] Patent Number: 5,942,316
[45] Date of Patent: Aug. 24, 1999

[54] MULTI-LAYER REFRACTORY WEAR BODY

[75] Inventors: Ernst Lührsen, Bad Schwalbach; Andreas Schuler, Taunusstein; Robert Sheriff, Ingelheim; Martin Wiesel, Wiesbaden, all of Germany

[73] Assignee: Didier-Werke AG, Wiesbaden, Germany

[21] Appl. No.: 08/932,551

[22] Filed: Sep. 17, 1997

[30] Foreign Application Priority Data

Sep. 18, 1996 [DE] Germany ............... 196 37 960

[51] Int. Cl.$^6$ .............. B32B 7/02; B32B 18/00; C04B 35/00
[52] U.S. Cl. ............... 428/213; 428/218; 428/312.6; 428/316.6; 428/319.1; 428/903.3; 501/99; 501/155
[58] Field of Search ............... 501/100, 99, 127, 501/155; 428/213, 218, 316.6, 319.1, 312.6, 903.3

[56] References Cited

U.S. PATENT DOCUMENTS

| 4,877,705 | 10/1989 | Polidor | 428/34.6 |
| 5,104,059 | 4/1992 | Claar | 228/124 |
| 5,139,977 | 8/1992 | Dwivedi | 501/127 |
| 5,614,308 | 3/1997 | Claar | 428/312.6 |

*Primary Examiner*—Blaine Copenheaver
*Attorney, Agent, or Firm*—John F.A. Earley; John F.A. Earley III; Harding, Earley, Folimer & Frailey

[57] ABSTRACT

The invention concerns a multi-layer refractory wear body having a wear layer being exposed to a direct thermal, mechanical and/or metallurgical attack, and at least another layer of a ceramic material having different physical properties.

7 Claims, No Drawings

MULTI-LAYER REFRACTORY WEAR BODY

The invention concerns a multi-layer refractory wear body having a wear layer being exposed to a direct thermal, mechanical and/or metallurgical attack, and at least another layer of a ceramic material having different physical properties.

Such a wear body in the form of refractory ceramic sliding plates for slide gate nozzles on metallurgical vessels have been known for a long time. They are improved continuously. Particular problematic regions are the sliding surfaces as well as the passage for the molten bath, above all.

Therefore, attempts have not been lacking to improve these problematic regions with regard to their thermal, mechanical and metallurgical (chemical) resistance.

In the DE-OS 1 935 424, a sliding plate on the basis of alumina—(aluminium oxide)-rich materials having a porosity of about 19% is proposed. To increase the accumulation of heat in the sliding plate, the sliding plate is inserted into a supporting body of highly porous refractory material (50 to 60%), which acts as an insulating shell.

It is intended to reduce the risk of freezing of the molten metal in this region by increasing the accumulation of heat.

A similar construction with a sliding plate being inserted into a supporting body is described in the German patent specification 1 937 742. The insert is bedded in mortar or cemented in.

Another embodiment of a multi-part sliding plate is disclosed in the German utility model 75 00 855 published in 1975. The portions along which the sliding plate slides, and the portions which are passed by the molten bath, respectively, are fabricated of high-quality materials. Behind them, an insulating body is disposed. The individual portions are mortared together.

In all cases, the prior art is based on a multi-part sliding plate, wherein the individual portions are fabricated separately and then mortared together.

A development of this prior art is described in the DE 27 19 105 A1. An oxidic, ceramic, high-quality, dense, ceramic insert is formed in situ into a matrix of refractory concrete. In order to take into account the different thermal expansion coefficients of the dense wear insert and the refractory concrete, it is proposed to surround the insert with a flexible layer. Compared with the prior art at that time, the advantage of the solution according to DE 27 19 105 A1 is that one process step is eliminated, because the wear resistant insert is directly formed in fabricating the base body. However, the indication of the flexible intermediate layer shows that considerable problems occur in this technology because of the different materials, which, to this day, have not been solved adequately.

First, the invention takes into account the correct indications in prior art that functional products of the said type (including nozzles, outlets, plugs, etc.) are exposed to particular thermal, mechanical and metallurgical attacks in certain regions which have to be optimized, whereas portions lying behind may be made of lower-grade ceramic qualities and sorts.

The invention further develops this basic idea by not prefabricating any longer the layers or individual layers and assembling them afterwards; rather, the invention is guided by the idea to combine the layers in situ to a composite body in a common moulding process, that is in maintaining the different material characteristics within the individual layers.

This idea is specified in that ceramic materials having a carbon content are employed for the materials of all layers, in order to form a continuous carbon bond after the common shaping, for example by pressing, as well as the subsequent thermal treatment, which combines the individual layers to a quasi-monolithic body.

It was determined by pretests that other bond types, as the ceramic bond, do not make the described process technology possible.

Insofar an important part of the inventive idea and a surprising effect is that refractory ceramic materials having totally different physical properties, for example totally different porosity values (bulk densities), can be pressed together in a common moulding process, if C-containing materials are used.

Accordingly, the invention in its most general embodiment concerns a multi-layer refractory wear body having the features of claim 1.

While the term wear body includes all kinds of refractory ceramic workpieces which are exposed to the thermal, mechanical and/or metallurgical (chemical) attack, the term "quasi-monolithic body" is defined in that the body needs not to have continuous isotropic properties but forms a matrix combining the layers being different in material that is it makes the combining techniques by gluing, cementing, or mortaring, needed in the prior art, unnecessary.

With the invention, a plurality of advantages can be attained:

Refractory qualities and grades are just needed for the wear regions. The other regions may be made of lower-grade and thus less expensive materials. Thereby, the material costs can be reduced noticeably.

The wear layer can be formed having a relatively small thickness. Although it should have a high density, the small thickness results in that no serious degassing problems occur in the pressing process.

Similar materials but different qualities can be used for the different layers. Thus, it is possible to fabricate the wear layer of a high-grade, aluminium oxide-rich, carbon bonded material and to employ the other layer (the other layers) at least partly of an analogous material, but as a processed, granulated recycling material.

The resistance to temperature changes of the whole body is improved.

In the case of an impregnation of the plates with infiltration inhibiting suspensions, especially pitch or tar, a total impregnation of the (relatively dense) wear layer is enabled, because the infiltration inhibiting suspension (liquid) can be drawn in—quasi from behind—via the (relatively porous) adjacent layer.

The production costs can be reduced, because now only one single process step (common pressing) is necessary.

The invention can be realized on unfired and fired shapes.

By selecting (mineralogical/chemical) like or similar materials for the layers, the thermal expansion coefficients can be adapted.

Several embodiments of the invention will be described in the following:

The wear layer may have an open porosity of not more than 10–15% and the adjacent layer may have a porosity of more than 15% (each before an possible impregnation with infiltration inhibiting materials).

While the wear layer may have a bulk density of at least 3.0 to 3.2 $g/cm^3$, the bulk density of the adjacent layer is given with not more than 2.6 to 2.9 $g/cm^3$ (also before any impregnation), in an embodiment.

The layer adjacent to the wear layer may be formed totally or partly by recycling material and is made of the same material as the wear layer (apart from the carbon content needed for the bond), according to an embodiment.

With regard to the specific selection of the materials the invention is not restricted. Basic as well as non-basic materials may be used. In any case, ceramic materials with carbon bond have to be used for the wear layer and the layer adjacent to it.

The described multi-layer structure provides decisive advantages in a totally different respect, too. In order to improve the infiltration inhibiting properties (particularly with regard to a metallurgical slag) and thus to enhance the stability, it is known to infiltrate infiltration inhibiting materials, as pitch and tar, into wear parts like sliding plates. In the process, the infiltration inhibiting suspension is drawn into the open pore volume, mostly by vacuum. However, the high density desired on the one hand is a problem in this secondary treatment insofar as the low and fine porosity permits only a relatively low penetration (penetration depth) of the treating medium, even at a correspondingly high vacuum. As a result, "the core" (the interior) of a high-quality (relatively dense) sliding plate often cannot be impregnated.

The multi-layer plate according to the invention overcomes this disadvantage in that the relatively dense wear layer may be formed noticeably thinner compared with prior art. Above all, the adjacent porous layer, due to its increased and more coarse pore volume, provides the possibility to infiltrate the wear layer also at the back via the adjacent porous layer. Both features together enable a total impregnation of the wear layer (and the adjacent layer), whereby the infiltration inhibiting properties of the plate and thus its life can be increased.

This object can be attained even if the wear layer amounts only to one half up to one fifth of the total thickness of the wear part.

In principle, the layers can be cast together. But it is understood that the common pressing is preferred, the different materials being filled into the flask one after the other and then being pressure loaded.

The further treatment is carried out according to the standards of prior art. This is true for a possible impregnation as well as a subsequent thermal treatment.

We claim:

1. A multi-layer refractory body exposed to wear, having a continuous carbon bond and at least a wear-layer of ceramic material comprising a carbon-content and being exposed to a thermal, mechanical and metallurgical attack and at least one further layer of a ceramic material containing a carbon content but with different physical properties than the wear layer, wherein the at least one further layer adjacent to the wear layer is made of, apart from a carbon content necessary for the bond, up to 100% by wt. of the ceramic material of the wear layer but in the form of a processed, granulated recycling material and wherein the wear layer and the at least one further layer are manufactured to a quasi monolithic body by molding of the wear layer and the at least one further layer in one common press-molding process.

2. The refractory body according to claim 1, wherein the wear layer has a lower open porosity than the further layer.

3. The refractory body according to claim 2, wherein the open porosity of the wear layer and the further layer is impregnated with an infiltration inhibiting suspension over its whole thickness.

4. The refractory body according to claim 1 wherein the wear layer has an open porosity of not more than 15% by vol. and the further layer has an open porosity of more than 15% by vol.

5. The refractory body according to claim 1 wherein the wear layer has an open porosity of not more than 12% by vol. and the further layer has an open porosity of at least 16% by vol.

6. The refractory body according to claim 1 wherein the wear layer has a bulk density of at least 3.0 $g/cm^3$ and the further layer has a bulk density of not more than 2.9 $g/cm^3$.

7. The refractory body according to claim 1 wherein the ratio of thickness of the wear layer to the further layer is from 1:2 to 1:5.

* * * * *